Aug. 22, 1967  H. P. KALMUS  3,336,806
GRAVITY METER

Filed Oct. 27, 1964  3 Sheets-Sheet 1

INVENTOR.
HENRY P. KALMUS

BY Harry M. Saragovitz
Edward J. Kelly, Herbert Berl &
J. D. Edgerton
ATTORNEYS

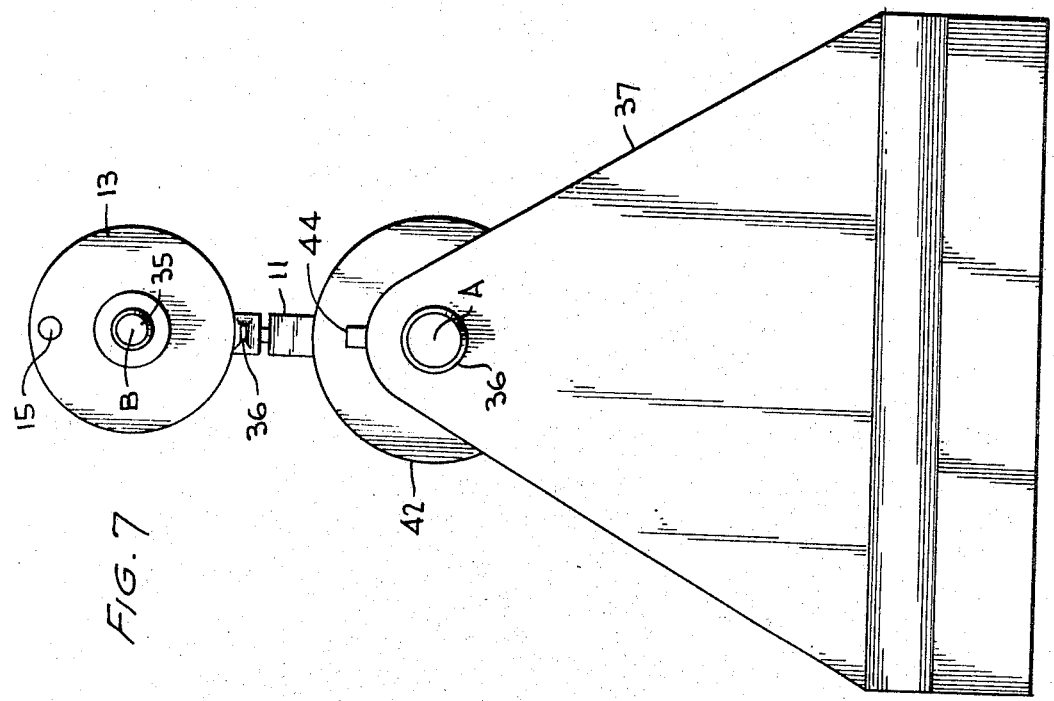
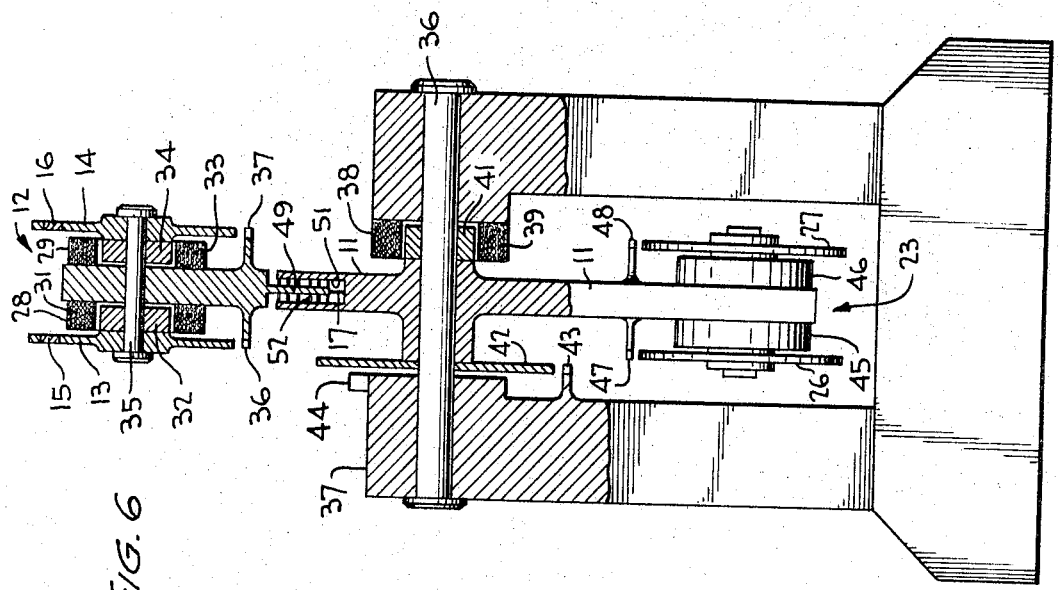

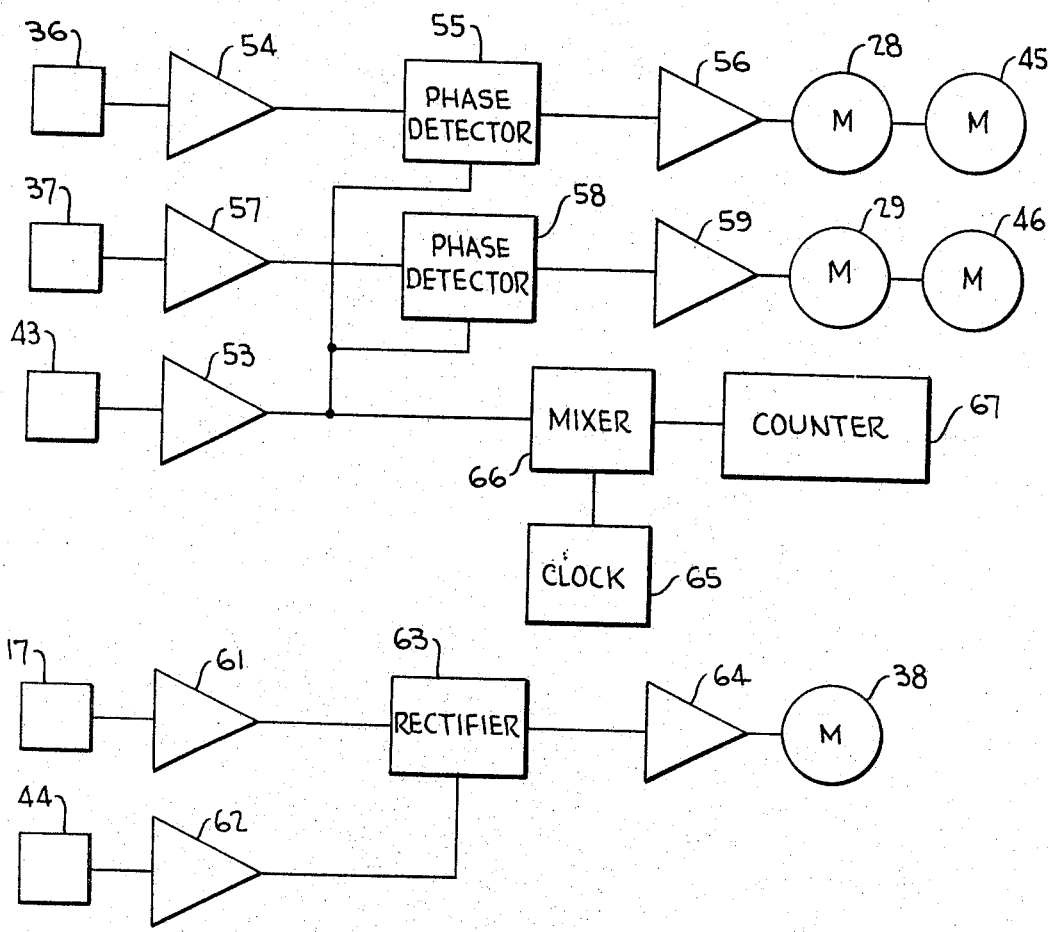

United States Patent Office 3,336,806
Patented Aug. 22, 1967

3,336,806
GRAVITY METER
Henry P. Kalmus, 3000 University Terrace NW.,
Washington, D.C. 20016
Filed Oct. 27, 1964, Ser. No. 406,941
3 Claims. (Cl. 73—382)

ABSTRACT OF THE DISCLOSURE

A gravity meter having two masses, one of which is rotated about a fixed point in a vertical plane and the other of which is rotated about the first mass also in a vertical plane, parallel to the plane of rotation of the first mass. A strain gauge is connected in the radius arm connecting the first mass to the fixed point to detect the internal forces in the radius arm resulting from the rotation of the aforementioned masses. The angular velocities of the two masses are adjusted to provide an AC null in the output of the strain gauge. When such a null is attained, the centrifugal force developed by the masses in the radius arm balances the force due to gravity in the radius arm. Since the angular velocity of the masses is directly related to the centrifugal force, a measurement of the angular velocity provides a measure of gravity.

---

The invention described herein may be manufactured and used by or for the Government of the United States of America for governmental purposes without the payment to me of any royalty thereon.

This invention relates to gravity meters, and more particularly to a dynamic gravity meter which utilizes centrifugal force of a magnitude that may be accurately determined with great precision to balance the gravitational forces to be measured.

The measurement of gravity and gravity differences has become of increasing importance in the last several years in such fields as geophysical prospecting and inertial navigation and in basic research of the physical characteristics of the earth. Classically, the absolute determination of gravity is accomplished by employing Kater's reversible pendulum. This pendulum is in the form of a thin brass bar having two fixed knife edges 39.4 inches apart and is adjusted by the positioning of three weights to have the same period of oscillation about each knife edge. The main weight is a fixture beyond one of the knife edges. A second adjustable weight is positioned near the other knife edge. The third weight in the form of a small slider is moved over an engraved range in the middle of the bar. Allowance must be made for temperature variations in the adjustment of the weights. The accuracy of the measurement also necessitates the recording of barometric pressures to permit a buoyancy correction to be made. The common period of oscillation about either knife edge is the period of a simple pendulum whose length is the distance between the knife edges. Thus, when such a pendulum is accurately timed, and the distance between the two knife edges is accurately measured, the value of gravity may be calculated by using the formula for the period of a simple pendulum. Pendulum observations are, however, relatively slow and tedious.

A number of gravity meters have been developed which provide a measurement of gravity differences between observation points. They have the advantages over pendulum apparatus of rapidity and accuracy of measurement. Gravity meters may be divided into three categories: dynamic gravity meters, stable gravity meters, and astatized gravity meters. The first of these, dynamic gravity meters, involves the measurement of time, generally of vibrations of a mechanical system. An example of this type of gravity meter is the vibrating string gravity meter. In this device a weight of mass M is used to provide tension in a thin wire of length L and mass $m$ per unit length. The period T of vibration is $$T = 2L\sqrt{m/Mg}$$

Oscillations are maintained electromagnetically.

In stable gravity meters, the weight of a mass is balanced against some other force, usually that developed by tensional or torsional springs. In these instruments, the design of springs with constant elastic properties is of primary importance, and most require temperature control. One such gravity meter employs a vertical helical spring, wound of a flat metallic ribbon, which supports a disk-shaped mass. An increase or decrease in the weight of the mass due to a difference in gravity causes rotation of the mass as well as elongation of the spring. The rotation is magnified optically and provides a measurement of the difference in gravity.

In astatized gravity meters a force is applied so as to increase any deflection from the equilibrium position. The design of these gravity meters is similar to that of seismographs, the astatization having the effect of increasing the natural period of oscillation of the system.

Most gravity meters, however, are subject to zero drift; i.e. the reading at a place of constant gravity changes in time. This is often due to the lengthening of the mass suspension members. These instruments must, therefore, be calibrated frequently against pendulum observations. Futhermore, these instruments are often adversely affected by variations in temperature and pressure. As a result, great care must be exercised in selecting materials with low temperature coefficients for the mass suspension members, and barometric readings must be made to account for the affect of the density of the air on the buoyancy of the mass system, or alternatively the mass system must be placed in a sealed, evacuated chamber. In almost all cases, gravity meters are highly sensitive to misalignment from the horizontal. This, of course, precludes their use in the adverse environments of aircraft or ships.

It is therefore an object of the present invention to provide a gravity meter which having been once calibrated permits the absolute measurement of gravity repeatably without recalibration.

It is another object of the instant invention to provide a gravity meter in which a force due to gravity is continually compared with an accurately measurable centrifugal force by means of an AC null method whereby a single transducer is exposed to equal pressure amplitudes from the force due to gravity and from the centrifugal force thereby rendering the transducer characteristically non-critical.

It is a further object of the invention to provide a gravity meter which is relatively insensitive to variations in temperature and pressure and in which alignment of the instrument with the horizontal is not critical.

According to the present invention, the foregoing and other objects are attained by providing a gravity meter having two masses one of which is rotated about a fixed point in a vertical plane and the other of which is rotated about the first mass in a plane parallel to the plane of rotation of the first mass. The resultant internal force in the radius arm connecting the first mass to the fixed point is detected by a strain gauge. The angular velocities of the two masses are adjusted to provide an AC null in the output of the strain gauge. When such a null is attained, the centrifugal force developed by the masses in the radius arm balances the force due to gravity in the radius arm. Since the angular velocity of the masses is directly related to the centrifugal force, a measurement of the angular velocity provides a measure of gravity.

The specific nature of the invention, as well as other objects, aspects, uses and advantages thereof, will clearly appear from the following description and from the accompanying drawings in which:

FIG. 6 is a front elevation in partial section of a preferred embodiment of the invention;

FIG. 7 is a side elevation of the embodiment shown in FIG. 6; and

FIG. 8 is a block diagram of the servo loops used in the embodiment shown in FIGS. 6 and 7.

Figure 1:
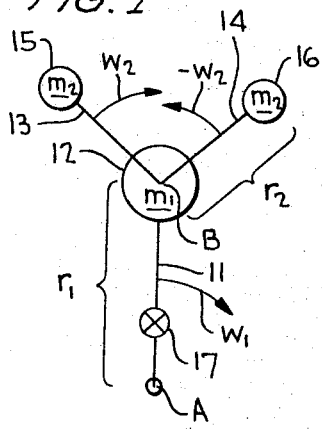
FIG. 1 is a simplified drawing showing the basic structure of the invention.

Referring now to the drawings wherein like reference numerals designate identical or corresponding parts throughout the several views, and more particularly to FIG. 1 wherein a long radius arm 11 with a length $r_1$ is shown rotating about a fixed point A with an angular velocity $w_1$. A weight 12 of mass $m_1$ is affixed at its center of mass B to the extreme end of the radius arm 11. Around the center of mass B of weight 12 two short radius arms 13 and 14 with length $r_2$ are rotating with angular velocities $w_2$ and $-w_2$, respectively, relative to the long radius arm. Weights 15 and 16 each having a mass $m_2$ are affixed to the extreme ends of radius arms 13 and 14, respectively. A strain gauge transducer 17 is inserted in radius arm 11 and generates a voltage proportional to the radial stress existing in the arm. The axles through A and B are horizontal.

Figure 2:
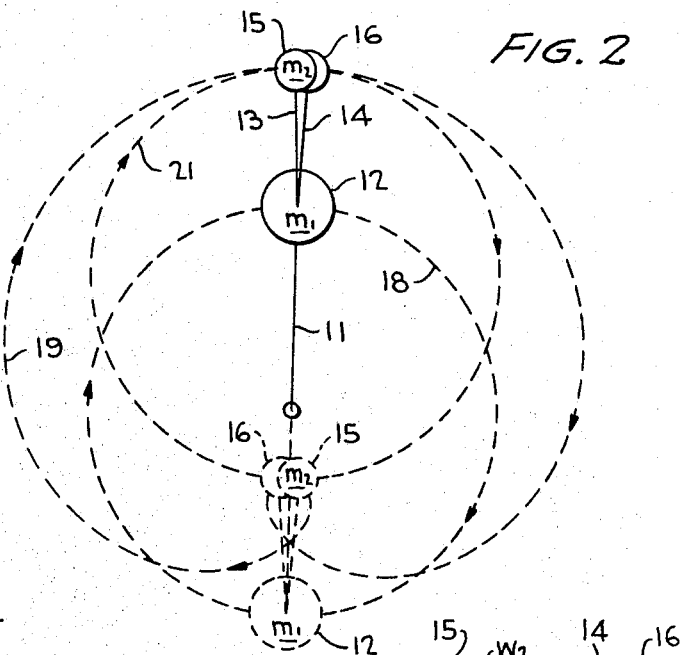
FIG. 2 is a simplified drawing illustrating the trajectories of the masses of the system shown in FIG. 1.

Let $w_1$ be equal to $w_2$. This means that, while the long radius arm 11 performs one revolution about point A, the short radius arms 13 and 14 revolve once around point B. As is shown in FIG. 2, the phase of the revolutions is adjusted in such a way that, for the radius arm 11 pointing vertically up, the two weights 15 and 16 are together at their highest point. When the radius arm 11 points vertically down, the two weights 15 and 16 are again together and pointing upwards. The dashed arrows 18, 19 and 20 in the figure represent the trajectories of the weights 12, 15 and 16, respectively.

An examination of the mass system will reveal the principle of the gravity meter. When the long radius arm 11 is pointing up, the force due to gravity compresses transducer 17; and when the radius arm 11 is pointing down, the force due to gravity expands transducer 17. The centrifugal force, however, works in just the opposite direction. Radius arm 11 is lengthened by the short radius arms 13 and 14 in its upward position and shortened in its downward position so that the centrifugal force expands transducer 17 more in the upward position of radius arm 11 than in the downward position. For a certain value of $m_1$ and $m_2$ and for a certain value of $w=w_1=w_2$, complete cancellation of the AC output occurs so that $g$ can be determined by measuring $w$. The transducer 17 together with a high gain amplifier and detector are used as a null detector. Only two elements have to be controlled with great accuracy and they are the angular velocity $w$ and the length $r_2$ of the short radius arms as will be shown by the following analysis.

The design as shown in FIG. 1 is just one special arrangement. In order to keep the treatment as general as possible, it will be assumed that $w_1 \neq w_2$. The problem is defined by the determination of the acceleration of a particle P on a moving curve. This acceleration is the resultant of three components of acceleration:

$a_1$=the acceleration constraint which is in turn the resultant of three components of acceleration:

$a_{11}$=the acceleration of point A around which the curve rotates, $a_{12}=rw^2$ from P to A, due to the rotation of AP about A, and $a_{13}=rw'$ perpendicular to AP;

$a_2$=the relative acceleration (found as if the curve were at rest); and $a_3$=the Coriolis acceleration (twice the product of the relative velocity of the particle along the curve by the angular velocity of the curve).

Assuming that only one weight 15 of mass $m_2$ is rotating and further assuming that $w_1$ and $w_2$ are constant and that all elements are rigid (no bending of the arms), we can determine the radial acceleration along $r_1$ (the centripetal accelerations are assumed positive for directions towards A and, for $t=0$ the initial position of the weight 15 is at its highest point). The accelerations of weight 15 are as follows:

$$a_{11}=0$$
$$a_{12}=w_1^2(r_1+r_2 \cos w_2 t)$$

and $$a_{13}=0$$

therefore, $$a_1=a_{12}=w_1^2(r_1+r_2 \cos w_2 t)$$

Also, $$a_2=w_2^2 r_2 \cos w_2 t$$

and $$a_3=2w_1 w_2 \cos w_2 t$$

The resultant acceleration $a_r$ of weight 15 is then:

$$a_r=a_1+a_2+a_3=w_1^2 r_1+(w_1+w_2)^2 r_2 \cos w_2 t$$

The resultant acceleration of weight 12 is as follows:

$$a_r=a_1=w_1^2 r_1$$

since $$a_2=a_3=0$$

For the two weights 15 and 16 counter-rotating, the Coriolis term $a_3$ disappears because of mutual cancellation of the two accelerations. Thus, the total resultant acceleration for the two weights 15 and 16 and weight 12 is as follows:

$$a_r=w_1^2 r_1+(w_1^2+w_2^2)r_2 \cos w_2 t$$

Figure 3:
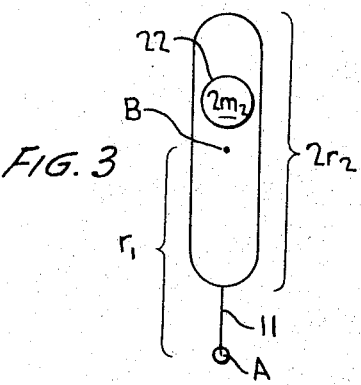
FIG. 3 is a simplified drawing of an analogous mass system of that shown in FIG. 1.

It is interesting to show that, if radial acceleration is considered, the function of the two counter-rotating weights 15 and 16 is equivalent to the function of a single weight 22 of mass $2m_2$ swinging radially along the long radius arm 11 with a sinusoidal motion as shown in FIG. 3. Thus, the equations of motion for the single weight 22 where $s$ is distance along the radius arm from point B, $\dot{s}$ is the linear velocity of the weight 22 along the radius arm, and $\ddot{s}$ is the linear acceleration of the weight 22 along the radius arm are as follows:

$$s=r_2 \cos w_2 t$$
$$\dot{s}=-w_2 r_2 \sin w_2 t$$

and $$\ddot{s}=-w_2^2 r_2 \cos w_2 t$$

Because we assume the acceleration towards A as positive, the relative acceleration $a_2$ of weight 22 is $$a_2=-\ddot{s}=w_2^2 r_2 \cos w_2 t$$

Also, $$a_1=a_{12}=w_1^2(r_1+r_2 \cos w_2 t)$$

since $$a_{11}=a_{13}=0$$

and $$a_3=0$$

hence, $$a_r=w_1^2 r_1+(w_1^2+w_2^2)r_2 \cos w_2 t$$

This, of course, is the same result we obtained before for two counter rotating weights 15 and 16.

The sign for the forces directed outward from point A are assumed to be positive. The resultant force $F_r$ is the sum of the masses multiplied by their accelerations:

$$F_r = 2m_2[w_1^2 r_1 + (w_1^2 + w_2^2) \cos w_2 t] + m_1 w_1^2 r_1 - (m_1 + 2m_2)g \cos w_1 t$$

This expression consists of three parts: a constant force $F_{DC}$;

$$F_{DC} = 2m_2 w_1^2 r_1 + m_1 w_1^2 r_1$$

a centrifugal force $F_C$, $$F_C = 2m_2(w_1^2 + w_2^2) r_2 \cos w_2 t$$

having a frequency $$f_C = \frac{w_2}{2\pi}$$

and a force due to gravity $F_g$, $$F_g = -(m_1 + 2m_2)g \cos w_1 t$$

having a frequency $$f_g = \frac{w_1}{2\pi}$$

Figure 4:
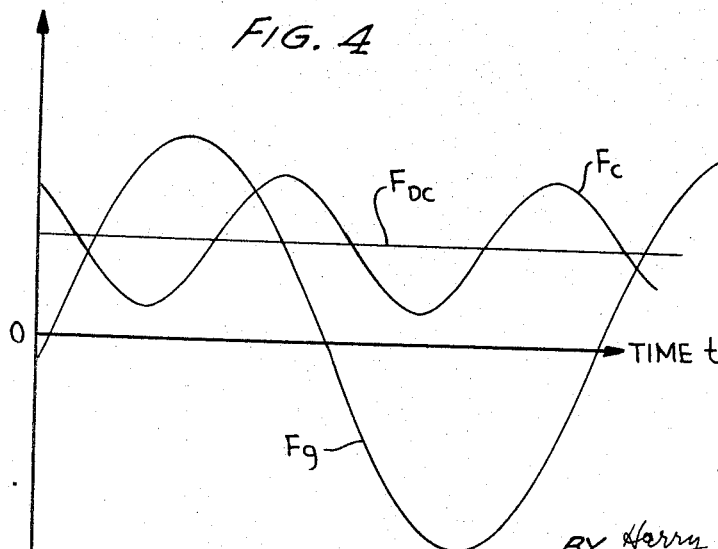
FIG. 4 is a graph of force versus time showing the three components of the resultant force measured by the strain gauge.

In FIG. 4 the three components of the resultant force $F_r$ are plotted versus time. The constant force $F_{DC}$ and the centrifugal force $F_C$ only would exist if the axes through points A and B were vertical rather than horizontal. For clarity in the graph of FIG. 4, it is assumed that $w_1 < w_2$. The value of gravity can now be determined if $F_C$ is compared with $F_g$. In order to compare two voltages with different frequencies, however, rectifiers are necessary. In addition the same transducer sensitivity would be required at the two frequencies. These difficulties are avoided by making $w_1 = w_2$ so that the transducer is acted upon by two periodic forces having the same frequency and equal amplitudes but opposite phases. A true null method can then be applied for the measurement of gravity.

If $w = w_1 = w_2$ and if only AC voltages with the frequency $w/2\pi$ are derived from transducer 17, then the transducer voltage E is as follows:

$$E = K[4m_2 w^2 r_2 - (m_1 + 2m_2)g] \cos wt$$

where K is the voltage produced by transducer 17 per unit force. For $E = 0$, the equation may be solved for gravity resulting in the following:

$$g = \frac{4m_2 w^2 r_2}{(m_1 + 2m_2)} \text{ cm./sec}^2$$

for $r$ measured in centimeters and $w$, in radians per second. Since $m_1$, $m_2$, and $r_2$ are constants, gravity is directly proportional to the square of the angular velocity.

Because the gravity meter is based on the comparison of two AC voltages, the waveforms of the voltages should be as free from distortion as possible. The is indeed the case if all the elements of the apparatus are rigid. In a practical machine, however, bending of the arms will occur, causing phase-modulation of the angular velocity. Again, in order to keep the equations as general as possible, it is assumed that $w_1 \neq w_2$.

The moment of inertia I of the total system changes periodically with frequency $w_2/2\pi$ because of the rotation of the small radius arms 13 and 14. The angular momentum tends to remain constant so that $w_1$ is modulated with frequency $w_2/2\pi$ as is shown by the following expression:

$$(w_1 I)_{2m_2} = w_1 2m_2(r_1^2 + r_2^2 + 2r_1 r_2 \cos w_2 t)$$

If a motor could drive the long radius arm 11 through a heavy flywheel and if the shaft between the flywheel and the radius arm 11 were inflexible, the radius arm would be driven at a constant velocity.

Figure 5:
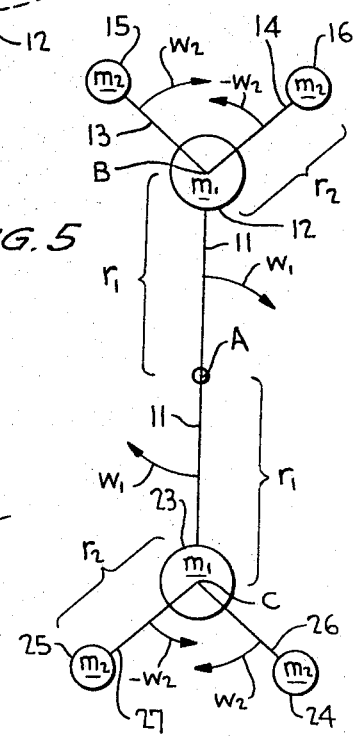
FIG. 5 is a simplified drawing showing the basic structure of the invention using two mass systems diametrically opposed to reduce the variations in torque required to drive the long radius arm of the gravity meter.

The flywheel and the inflexible shaft can be replaced by the arrangement shown in FIG. 5. By extending the long radius arm 11 to the other side of point A an equal distance $r_1$, affixing a weight 23 having a mass $m_1$ at its center of mass C to the other extreme end of the thus extended radius arm 11, and providing two additional weights 24 and 25 each having a mass $m_2$ and counter-rotating about point C from small radius arms 26 and 27 each having lengths $r_2$ with angular velocities $w_2$ and $-w_2$, respectively, the angular momentum for the system shown in FIG. 5 with four small weights 15, 16, 24, and 25 is as follows:

$$(w_1 I)_{4m_2} = w_1 2m_2(r_1^2 + r_2^2 + 2r_1 r_2 \cos w_2 t + r_1^2 + r_2^2 - 2r_1 r_2 \cos w_2 t)$$

or $$(w_1 I)_{4m_2} = w_1 4m_2(r_1^2 + r_2^2)$$

which is constant.

FIGS. 6 and 7 show the mechanical detail of a preferred embodiment of the invention. The small weights 15 and 16 are carried by two thin aluminum disks 13 and 14, respectively, which act as the small radius arms. The disks are driven in counter-rotation by two small electric motors 28 and 29. Motor 28 comprises a stator 31 which is rigidly attached to one end of the long radius arm 11 and a rotor 32 which is rigidly attached to disk 13. Motor 29 comprises a stator 33 which is rigidly attached to the same end of radius arm 11 as is stator 31 and a rotor 34 which is rigidly attached to disk 14. Both rotor and disk assemblies rotate on a common shaft 35 located at point B. Thus, the motors 28 and 29 together constitute the large weight 12. For the control of the speed of the motors 28 and 29, the disks 13 and 14 support at their periphery a magnetic recording signature of 100,000 waves. Assuming a radius of 11 cm., the circumference of the disks is 69 cm. The recorded wavelength is, therefore, $0.69 \times 10^{-3}$ cm. which is a value that is actually used on good recorders. Two magnetic record sensing heads 36 and 37 supported from the long radius arm 11 are positioned adjacent to the edges of disks 13 and 14, respectively. Assuming that the disks 13 and 14 are driven by their respective motors 28 and 29 at 10 r.p.s., the two magnetic heads 36 and 37 develop signals having a frequency of 1 mc./sec.

The long radius arm 11 is fixedly attached to a shaft 36 at point A, and the shaft 36 rotates in the bearings of a U-shaped frame 37. Radius arm 11 is driven by a motor 38 which comprises a stator 39 which is rigidly attached to the frame 37 and a rotor 41 which is rigidly attached to radius arm 11. The speed control of motor 38 is accomplished in the same way as with the motors 28 and 29. For this purpose a thin aluminum disk 42 is fixedly attached to radius arm 11 and carries a recording medium on its rim. A magnetic head 43 supported by the frame 37 is positioned adjacent to the rim of disk 42 to pick up the recorded wave. The magnetic recording signature on the rim of disk 42 is also 100,000 waves; therefore, ten revolutions of the long radius arm 11 about shaft 36 would produce a signal having a frequency of 1 mc./sec in magnetic head 43. In addition, the disk 42 carries another magnetic signature of one wave on its surface. A magnetic head 44, supported by frame 37, is positioned adjacent the magnetic signature on the surface of disk 42. The signal developed by the magnetic head 44 has a frequency equal to the number of revolutions per second of the long radius arm 11.

Motors 45 and 46 having a common axis at point C at the other end of long radius arm 11 constitute the weight 23. Disks 26 and 27 are driven in counter-rotation by motors 45 and 46, respectively, in a manner similar to that described with respect to motors 28 and 29 and disks 13 and 14. Speed control of the motors 45 and 46 may be accomplished by either slaving motors 45 and 46 to motors 28 and 29, respectively, or providing the disks 26 and 27 with a magnetic recording signature at their peripheries and sensing these with magnetic heads 47 and 48, respectively, supported by radius arm 11.

It is very important that the strain gauge transducer 17 should respond only to radial forces. It should be as insensitive as possible to any lateral stress of the radius arm 11. To attain this, the radial arm 11 is split into two parts, one of which has an appurtenance 49 of considerably smaller cross-sectional dimensions than that of arm 11 that extends in a radial direction. This appurtenance 49 is supported within a recess 51 of the other part of radius arm 11 by a series of thin, flexible membranes 52. The membranes 52 permit free radial motion but impede lateral motions. The transducer 17 is connected between the appurtenance 49 and the bottom of the recess 51.

A block diagram of the servo loops is shown in FIG. 8. Motors 28 and 45 are slaved to motor 38 by comparing the signal output from amplifier 53, which has its input connected to magnetic head 43, with the signal output of amplifier 54, which has its input connected to magnetic head 36, in phase detector 55. Whenever motors 28 and 45 advance or retard with respect to motor 38, a positive or negative voltage is developed by phase detector 55 and amplified by motor control amplifier 56 which drives the motors 28 and 45. Similarly, motors 29 and 46 are slaved to motor 38 by comparing the signal output from amplifier 53 with the signal output of amplifier 57, which has its input connected to magnetic head 37, in phase detector 58. The error voltage developed by phase detector 58 is amplified by motor control amplifier 59 which drives motors 29 and 46. The slaving operation could, of course, be performed mechanically. It is, however, believed that the electronic system is more exact and has the advantage that less weight has to be supported by the moving parts.

The signal developed by the magnetic head 44 is used to control the speed of the motor 38. Recall now that the expression for the voltage E produced by transducer 17 consisted of two parts, one of which was due to the centrifugal force and the other of which was caused by the force due to gravity. For $E=0$, the amplitudes of these two parts are equal and opposite. Thus, if the angular velocity $w$ is measured, gravity can be determined. If the angular velocity is too high or too low, the phase of E will be either 0° or 180° compared with the phase of the gravity component alone. This phase reference is delivered by magnetic head 44. The amplified voltage developed by strain gauge transducer 17 is provided at the output of amplifier 61. This is compared with the output of amplifier 62, which has its input connected to magnetic head 44, in phase-sensitive rectifier 63. If the output of phase-sensitive rectifier 63 is positive or negative, motor 38 is speeded up or slowed down by the action of motor control amplifier 64.

The signal from the magnetic head 43 is compared with the output from a master clock 65 in a mixer 66. The difference frequency developed by the mixer 66 is then measured by the counter 67. Because $$\frac{\Delta g}{g} = \frac{2\Delta w}{w}$$

and assuming that the master clock delivers a frequency of 1 mc./sec and that that frequency corresponds to a certain value of gravity, a deviation of gravity by 1 milligal will produce a beatnote of ½ c.p.s. Observation of this beatnote for a period of ten seconds should be sufficient to determine the exact value of the beat-frequency. Actually, it takes longer to perform a measurement of gravity. The output of the strain gauge transducer contains a certain amount of noise due to an unavoidable amount of bearing roughness so that the bandwidth of amplifier 61 has to be restricted. The same effect can be achieved by introducing a low pass filter after phase-sensitive detector 63. Whichever method is used, the time of response of the instrument is increased. If the instrument is used on a periodically accelerated platform as on an airplane or aboard a ship or submarine, additional integration networks have to be employed after the phase-sensitive rectifier 63.

The alignment of the instrument, that is its deviation from the horizontal, is not critical. Assuming that the gravity meter is tilted about the axis of the long radius arm 11 by an angle $\alpha$, the centrifugal force would be phase shifted by the angle $\alpha$ with respect to the force due to gravity. For correct alignment, $$K4m_2w^2r_2 = K(m_1+2m_2)g$$

After the two signals have been compared in the phase-sensitive rectifier 63, an error voltage is produced which is proportional to $1-\cos\alpha$ which is approximately equal to $\alpha^2/2$. For an accuracy of one part in $10^6$, the error voltage has to be kept smaller than $10^{-6}$. Hence, $\alpha^2/2$ must be less than $10^{-6}$ or $\alpha$ must be less than $\sqrt{2}\times10^{-3}$ radians. This means that $\alpha$ has to be smaller than 25 arc seconds, an adjustment which can be easily performed by conventional means.

It will be apparent that the embodiment shown is only exemplary and that various modifications can be made in construction and arrangement within the scope of the invention as defined in the appended claims.

I claim as my invention:
1. A gravity meter which utilizes centrifugal force of a magnitude that may be accurately determined with great precision to balance the gravitational force to be measured comprising:
   (a) a first weight having a fixed and known mass,
   (b) a first radius arm having a fixed length and connecting said first weight at its center of mass to a fixed point, said first weight and said first radius arm being free to rotate in a single plane of rotation about the fixed point,
   (c) a second weight having a fixed and known mass,
   (d) a second radius arm having a fixed and known length and connecting said second weight to the center of mass of said first weight, said second weight and said second radius arm being free to rotate about the center of mass of said first weight in a plane parallel to the plane of rotation of said first weight about said fixed point,
   (e) first drive means connected to said first radius arm for rotating said first weight,
   (f) second drive means connected to said second radius arm for rotating said second weight,
   (g) controlling means connected to said first and second drive means for adjusting the angular velocities of said first and second weights,
   (h) transducer means connected to said first radius arm for sensing the resultant internal radial force in said first radius arm,
   (i) Null detecting means connected to said transducer means whereby, when said controlling means adjusts the angular velocities of said first and second masses to cause the centrifugal force in said first radius arm to balance the gravitational force in said first radius arm, an AC null is indicated, and
   (j) measuring means located at said fixed point for measuring the angular velocity of said first weight, the measurement providing an accurate and precise measure of gravity when said controlling means adjusts the angular velocities of said first and second weights to produce an AC null in said transducer means thereby causing the centrifugal force in said first radius arm to balance the gravitational force in said first radius arm.

2. A gravity meter as recited in claim 1 further comprising:
   (a) a third weight having a mass equal to the mass of said second weight,
   (b) a third radius arm having a length equal to the length of said second radius arm and connecting said third weight to the center of mass of said first weight, said third weight and said third radius arm being free to rotate about the center of mass of said first weight in a plane parallel to the plane of rotation of said first weight about said fixed point, and (c) third drive means connected to said third radius arm for rotating said third weight in a direction opposite to the direction of rotation of said second weight, said controlling means additionally being connected to said third drive means for adjusting the angular velocity of said third weight.

3. A gravity meter as recited in claim 2 wherein said first radius arm extends beyond said fixed point a distance equal in length to the distance between said fixed point and the center of mass of said first weight and further comprising:

(a) a fourth weight having a mass equal to the mass of said first weight and connected at its center of mass to said first radius arm diametrically opposed to said first weight, (b) a fifth weight having a mass equal to the mass of said second weight, (c) a fourth radius arm having a length equal to the length of said second radius arm and connecting said fifth weight to the center of mass of said fourth weight, said fifth weight and said fourth radius arm being free to rotate about the center of mass of said fourth weight in a plane parallel to the plane of rotation of said first and fourth weights about said fixed point, (d) a sixth weight having a mass equal to the mass of said second weight, (e) a fifth radius arm having a length equal to the length of said second radius arm and connecting said sixth weight to the center of mass of said fourth weight, said sixth weight and said fifth radius arm being free to rotate about the center of mass of said fourth weight in a plane parallel to the plane of rotation of said first and fourth weights about said fixed point, (f) fourth drive means connected to said fourth radius arm for rotating said fifth weight, and (g) fifth drive means connected to said fifth radius arm for rotating said sixth weight in a direction opposite to the direction of rotation of said fifth weight, said controlling means additionally being connected to said fourth and fifth drive means for adjusting the angular velocities of said fifth and sixth weights.

No references cited.

JAMES J. GILL, *Acting Primary Examiner.*

RICHARD C. QUEISSER, *Examiner.*

I. C. McCLELLAND, *Assistant Examiner.*